June 7, 1955 D. M. PEARL 2,710,317
SELF-CANCELING VEHICLE DIRECTIONAL SIGNALING DEVICE
Filed Aug. 25, 1951 8 Sheets-Sheet 1
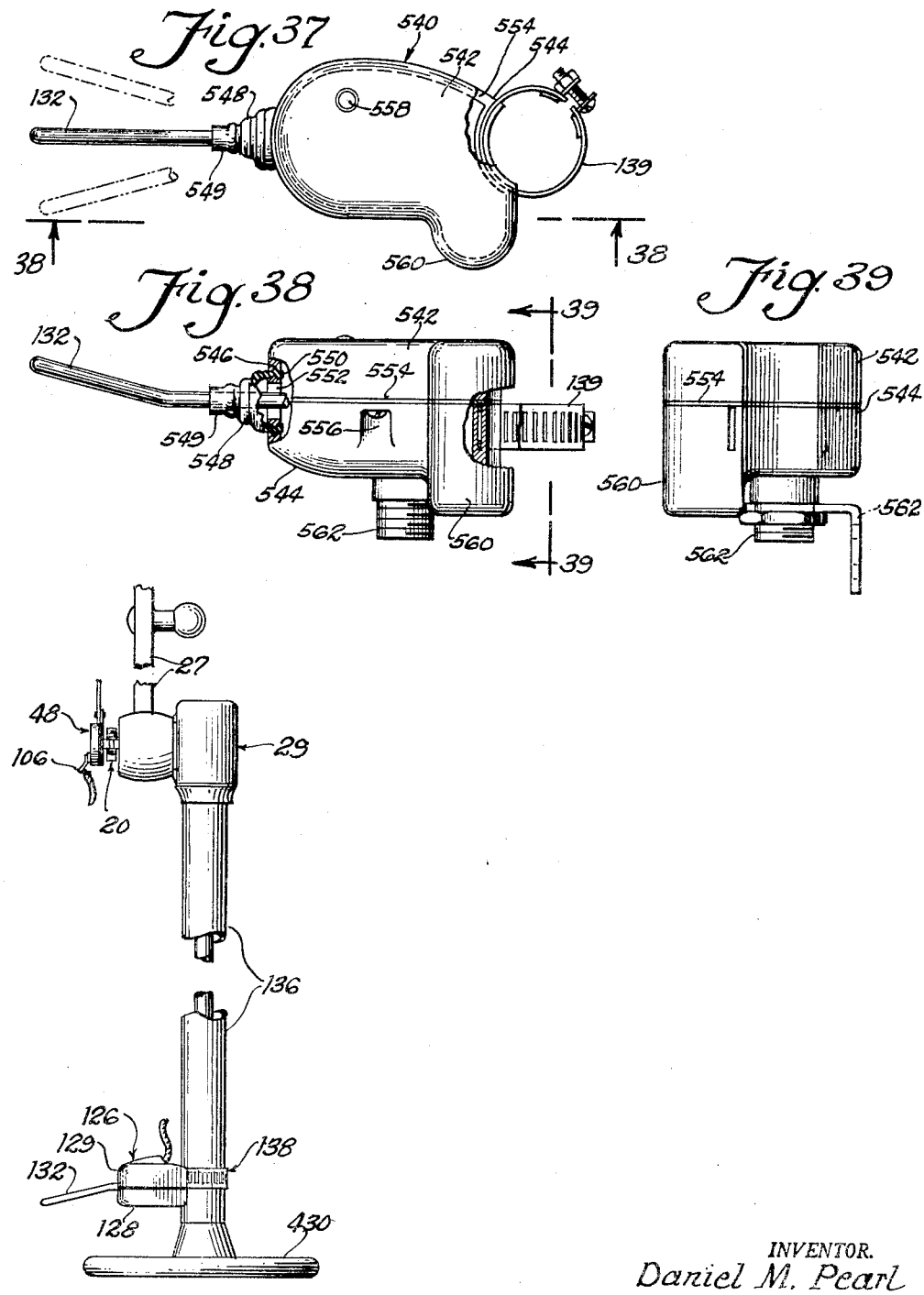
INVENTOR.
Daniel M. Pearl
BY
Louis Sheldon
Attorney June 7, 1955
D. M. PEARL
2,710,317
SELF-CANCELING VEHICLE DIRECTIONAL SIGNALING DEVICE
Filed Aug. 25, 1951
8 Sheets-Sheet 2
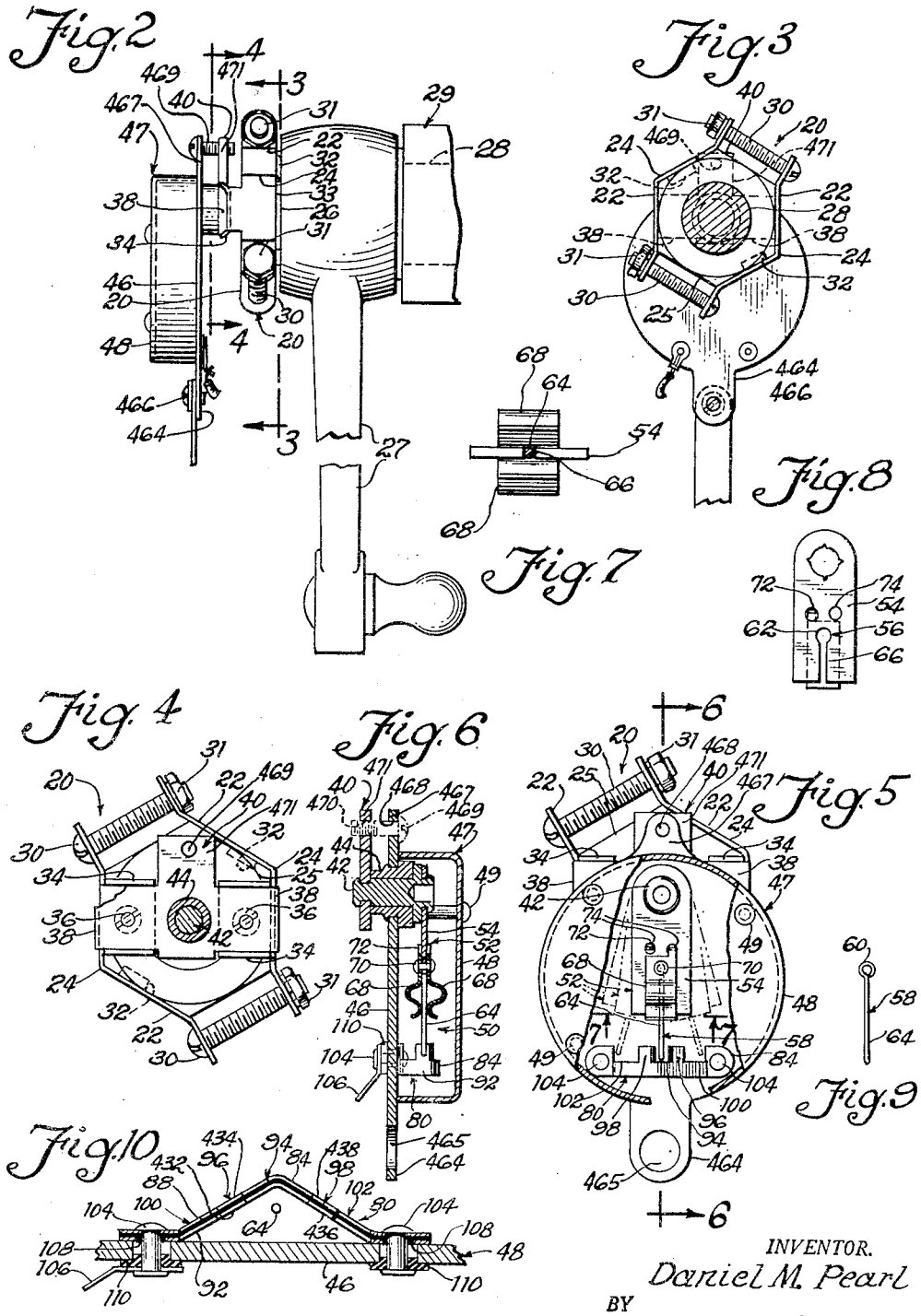
INVENTOR.
Daniel M. Pearl
BY
Louis Sheldon
Attorney June 7, 1955
D. M. PEARL
2,710,317
SELF-CANCELING VEHICLE DIRECTIONAL SIGNALING DEVICE
Filed Aug. 25, 1951
8 Sheets-Sheet 3
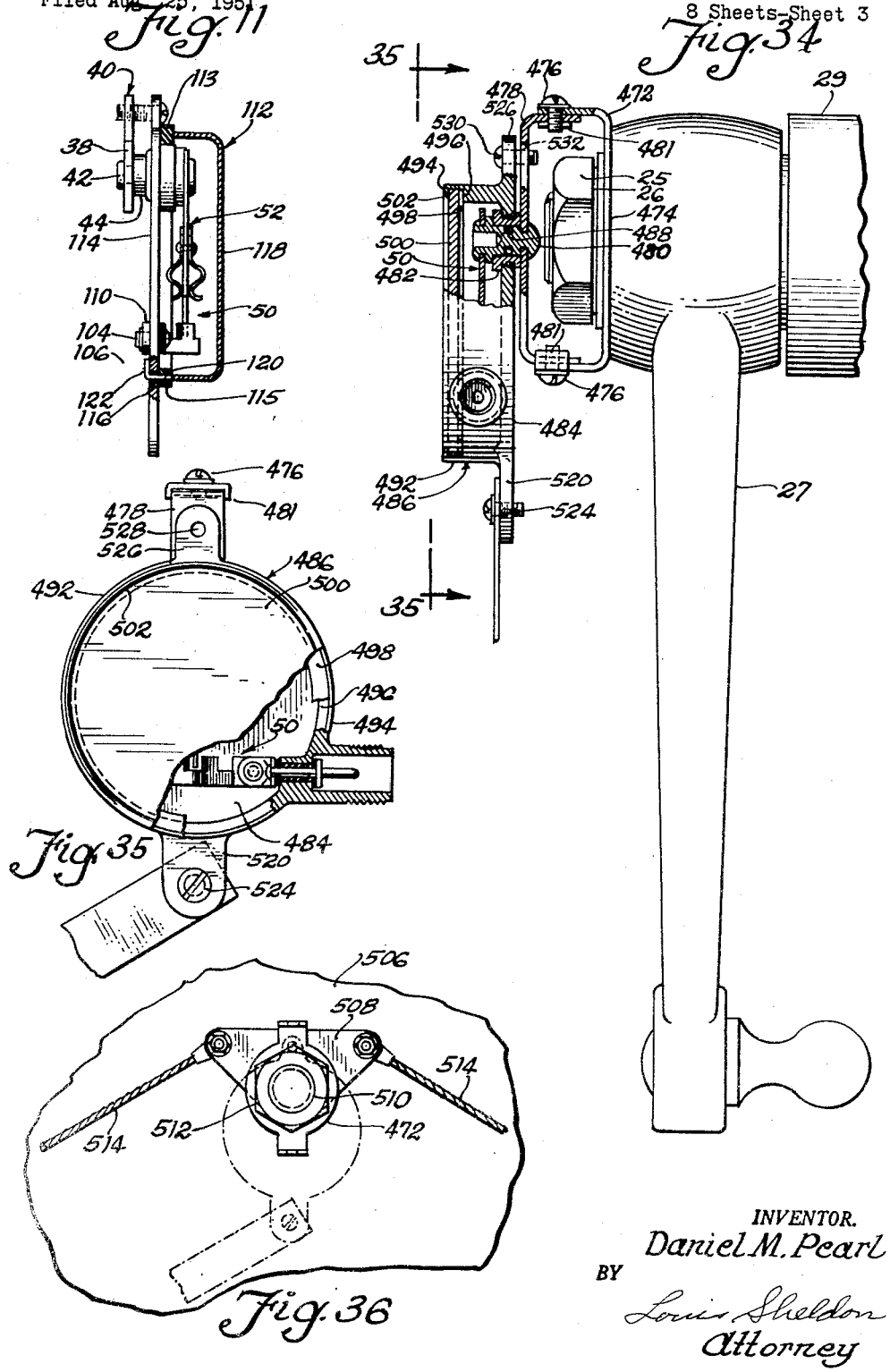
INVENTOR.
Daniel M. Pearl
BY
Louis Sheldon
Attorney June 7, 1955          D. M. PEARL          2,710,317
SELF-CANCELING VEHICLE DIRECTIONAL SIGNALING DEVICE
Filed Aug. 25, 1951          8 Sheets-Sheet 4
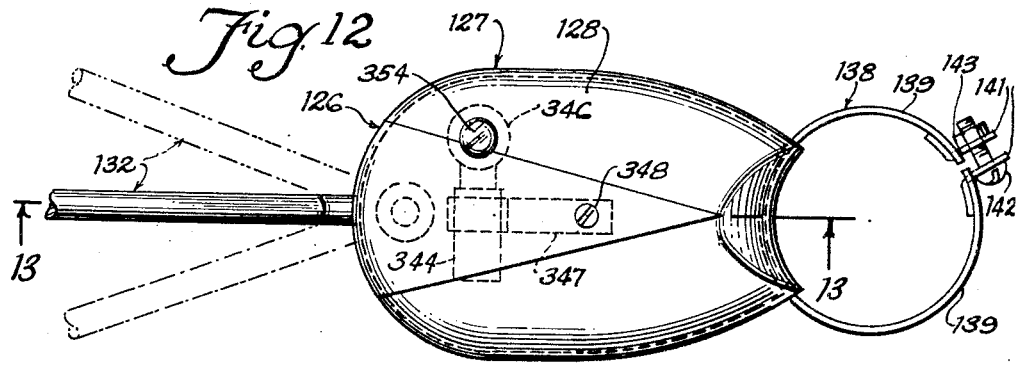
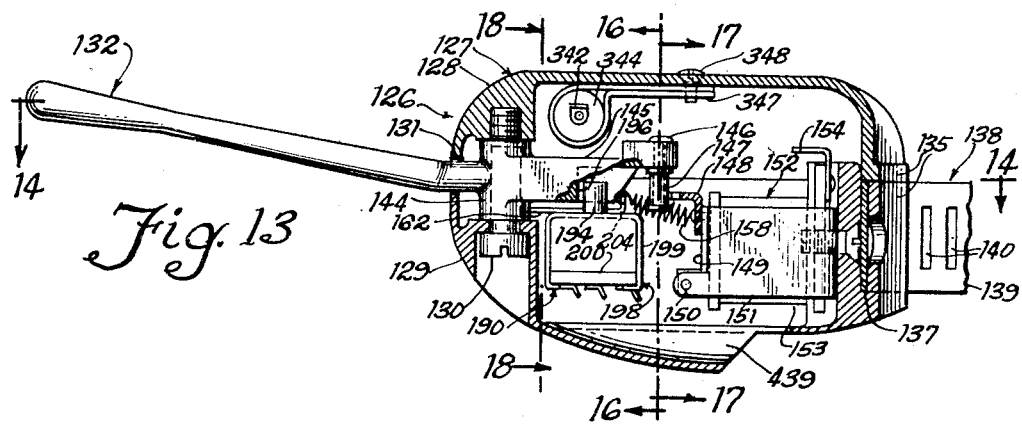
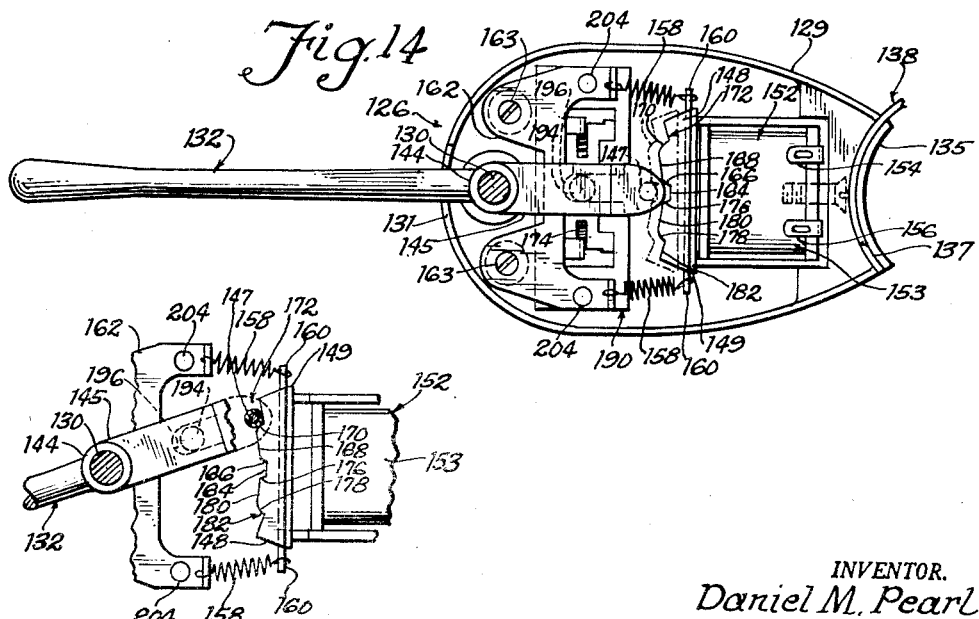
INVENTOR.
Daniel M. Pearl
BY
Louis Sheldon
Attorney June 7, 1955 D. M. PEARL 2,710,317
SELF-CANCELING VEHICLE DIRECTIONAL SIGNALING DEVICE
Filed Aug. 25, 1951 8 Sheets-Sheet 5
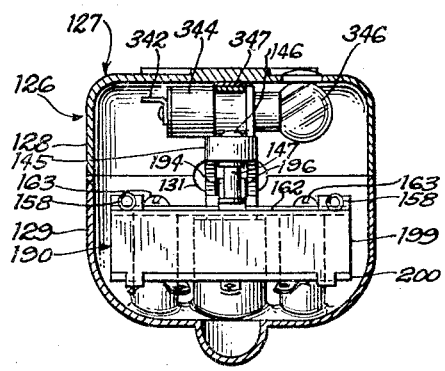
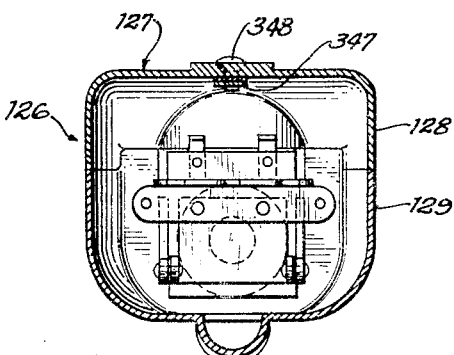
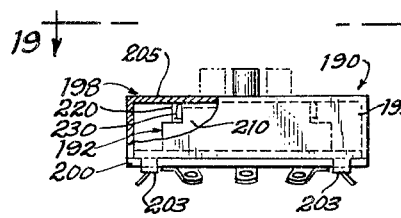
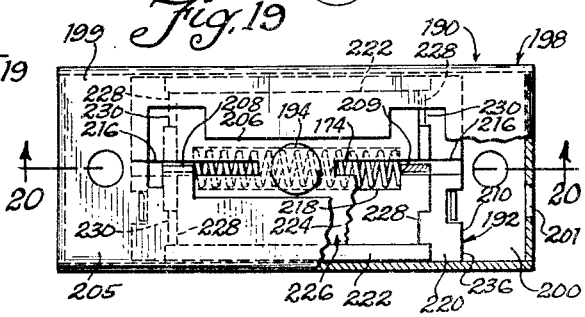
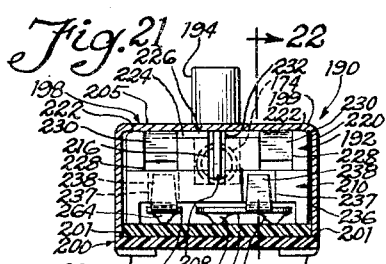
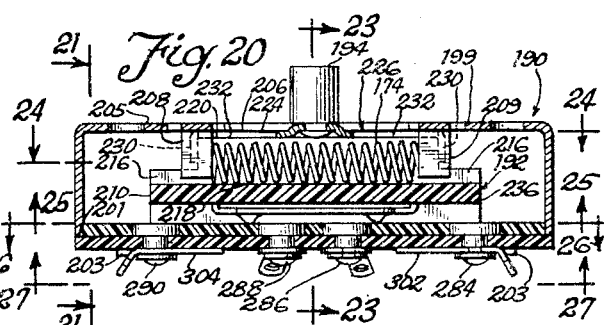
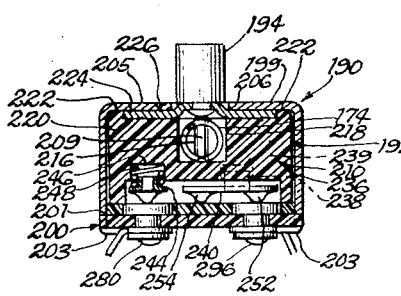
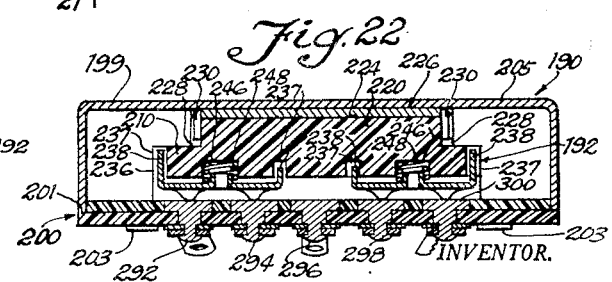

June 7, 1955  D. M. PEARL  2,710,317
SELF-CANCELING VEHICLE DIRECTIONAL SIGNALING DEVICE
Filed Aug. 25, 1951  8 Sheets-Sheet 6
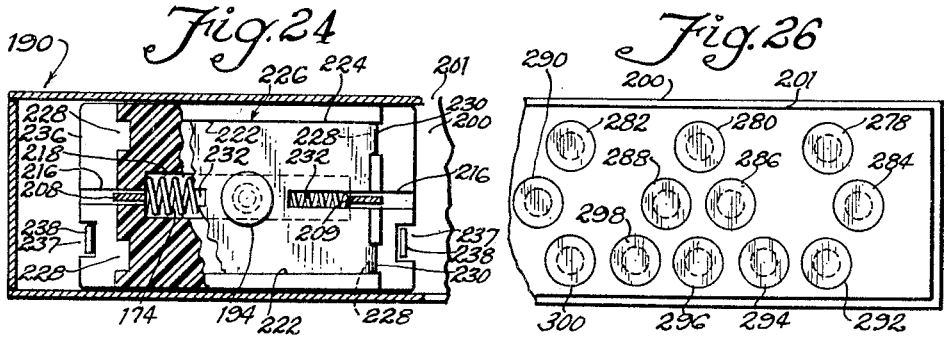
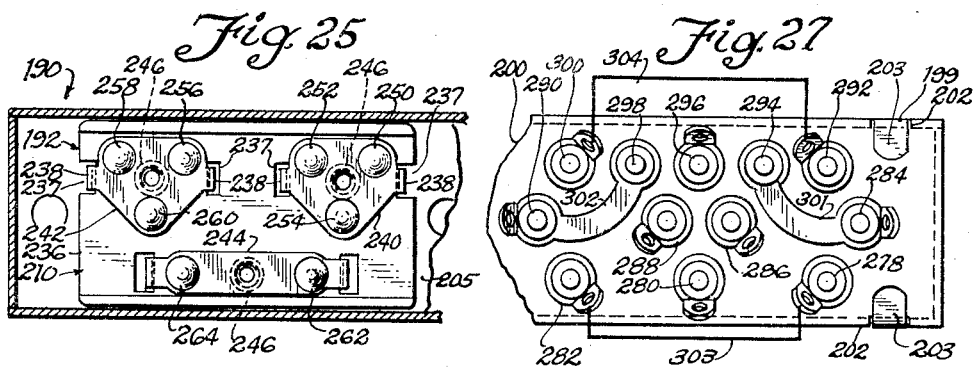
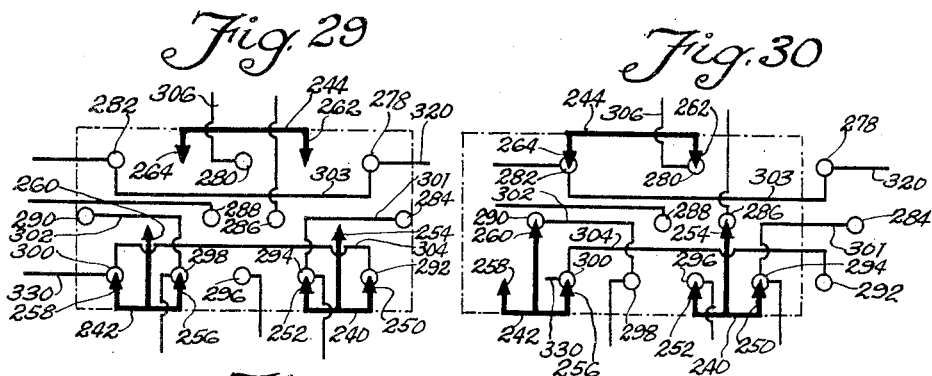
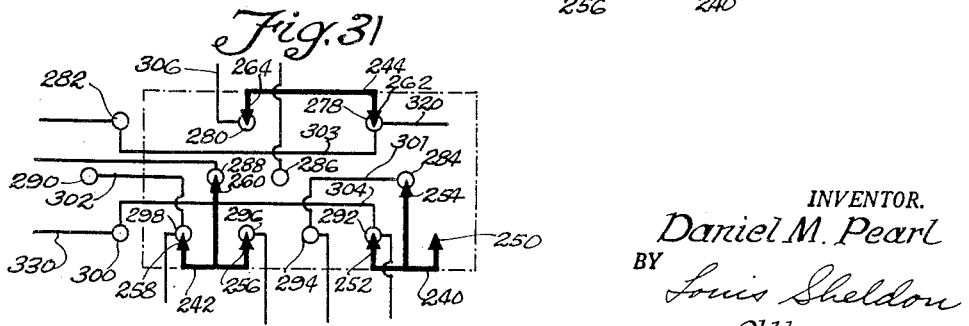
INVENTOR.
Daniel M. Pearl
BY Louis Sheldon
Attorney June 7, 1955   D. M. PEARL   2,710,317
SELF-CANCELING VEHICLE DIRECTIONAL SIGNALING DEVICE
Filed Aug. 25, 1951   8 Sheets-Sheet 7
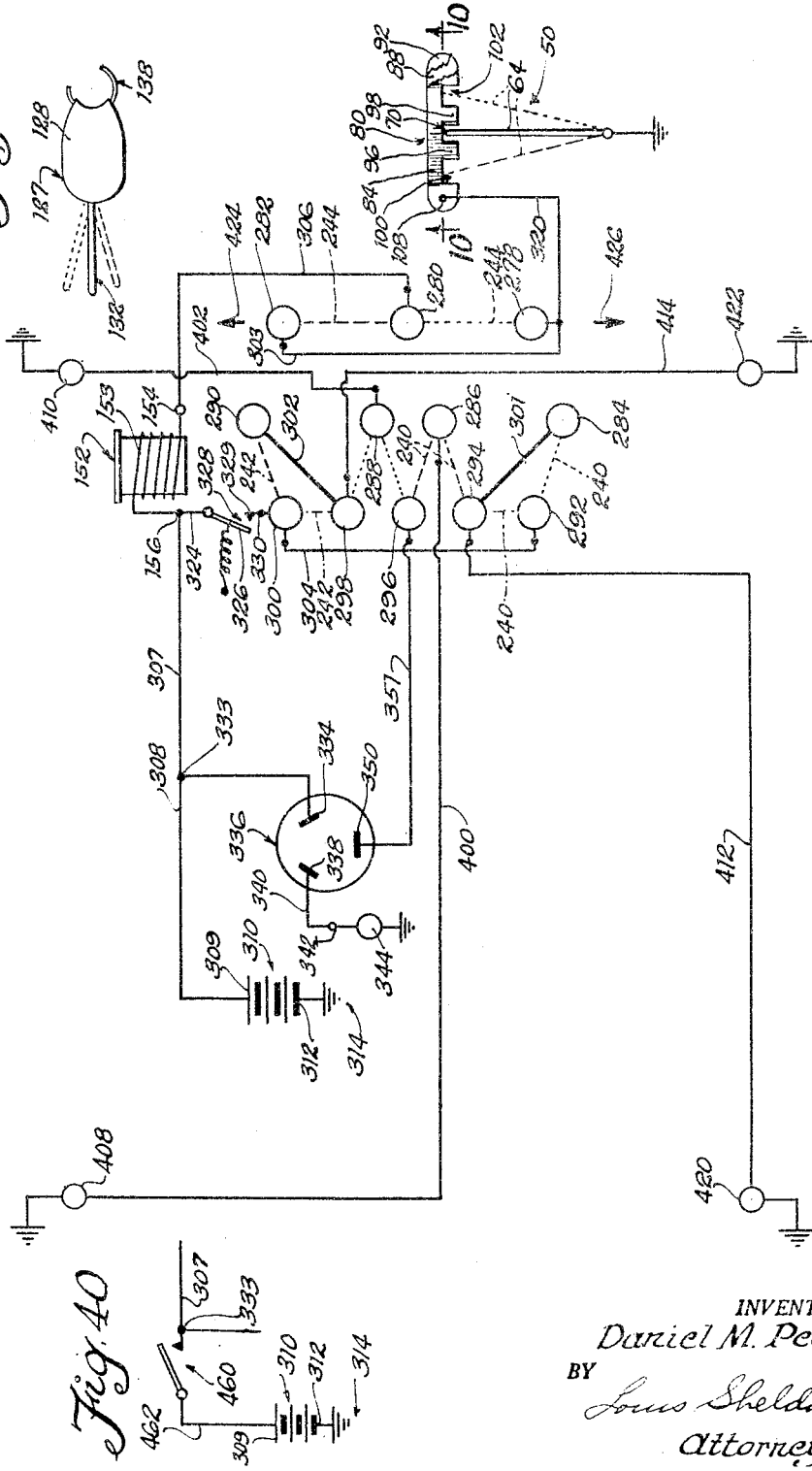
INVENTOR.
Daniel M. Pearl
BY
Louis Sheldon
Attorney June 7, 1955

D. M. PEARL 2,710,317

SELF-CANCELING VEHICLE DIRECTIONAL SIGNALING DEVICE

Filed Aug. 25, 1951

INVENTOR.
Daniel M. Pearl
BY
Louis Sheldon
Attorney

United States Patent Office 2,710,317
Patented June 7, 1955

2,710,317

SELF-CANCELING VEHICLE DIRECTIONAL SIGNALING DEVICE

Daniel M. Pearl, Chicago, Ill., assignor to Darwin Products, Inc., Chicago, Ill., a corporation of Illinois Application August 25, 1951, Serial No. 243,611

23 Claims. (Cl. 200—61.33)

This invention relates to self-canceling directional signal systems and mechanisms for motor vehicles, civil and military.

An object of the invention is to provide a system of the character referred to which is capable of being mounted on all types and makes of automobiles, trucks, tractors, army tanks and other vehicles, irrespective of differences in construction and dimensions of the cooperating parts of the various vehicles.

A further object is to provide a system of the type referred to in which the self-cancellation is effected irrespective of the location of the directional lever on the vehicle.

An additional object is to provide a system of the character referred to in which the directional lever may be mounted independently of the steering column.

Another object is to provide a novel self-canceling switch.

It is also an object of the invention to provide an improved conversion kit incorporating a self-canceling directional signal system adapted to be expeditiously installed on all types and makes of vehicles.

It is a further object of the invention to provide an improved directional signalling mechanism.

Further objects and advantages of the invention will appear as the description proceeds.

The invention will be better understood upon reference to the following description and accompanying drawings, in which:

Fig. 1 is a plan view showing a steering wheel, steering column, gear box and steering arm with which mechanism embodying features of the invention are assembled.

Fig. 2 shows a portion of the structure of Fig. 1 enlarged and in greater detail, including the automatic canceling or shut-off switch unit and the means for clamping it to the steering arm nut.

Figure 33:
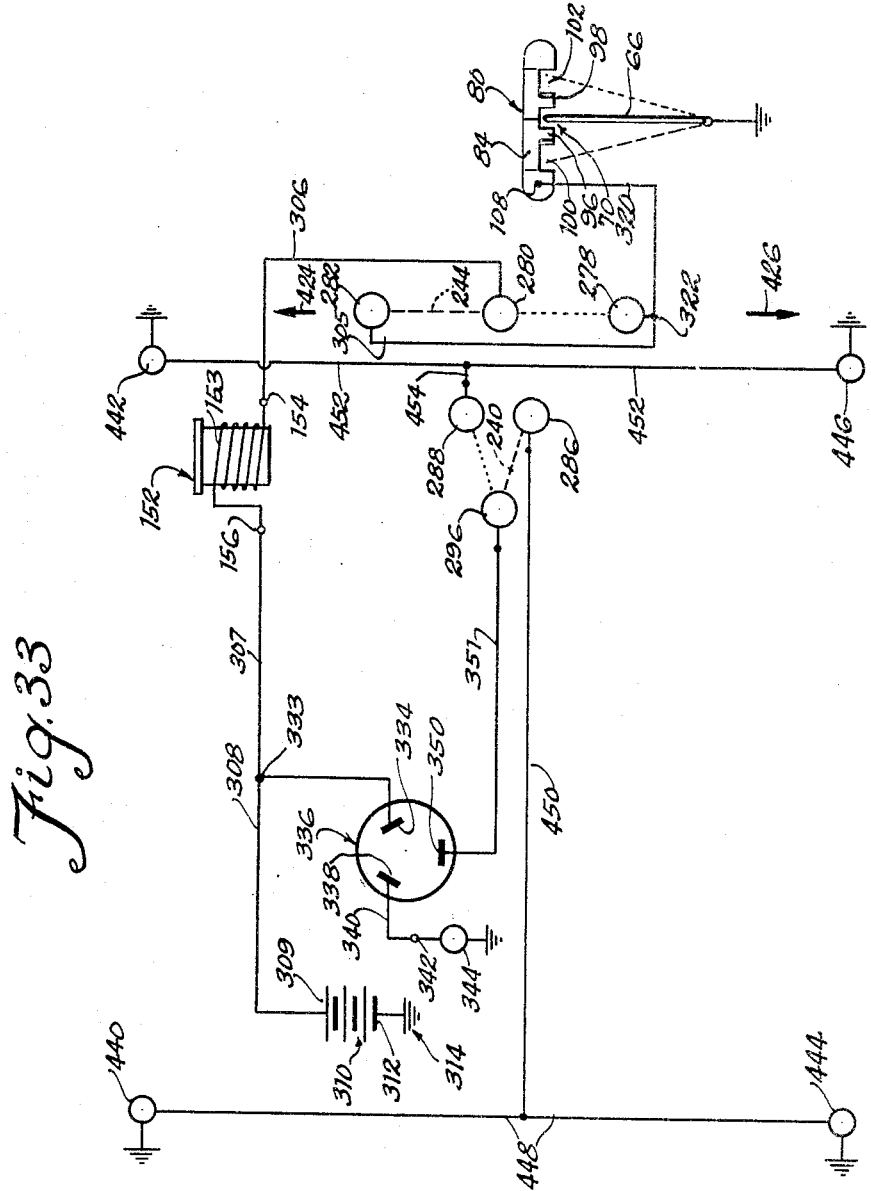

Figs. 3 and 4 are taken as indicated by the lines 3—3 and 4—4 in Fig. 2.

Fig. 5 is similar to Fig. 4 but shows details of the shut-off switch.

Figs. 6 and 7 are taken as indicated by the lines 6—6 and 7—7 in Fig. 5.

Figs. 8 and 9 show parts of the switch arm appearing in Fig. 5.

Fig. 10 is taken as indicated by the line 10—10 in Fig. 28 and shows further details of the shut-off switch.

Fig. 11 is similar to Fig. 6 but shows a modified casing for the shut-off switch.

Fig. 12 is an enlarged elevational view of the directional lever and associated mechanism.

Fig. 13 is taken as indicated by the line 13—13 in Fig. 12.

Fig. 14 is taken as indicated by the line 14—14 in Fig. 13.

Fig. 15 shows a portion of Fig. 13 but with the directional lever in left-turn-indicating position.

Figs. 16 and 17 are taken as indicated by the lines 16—16 and 17—17 in Fig. 13.

Fig. 18 is an elevational view of the lighting switch unit, taken as indicated by the line 18—18 in Fig. 13.

Fig. 19 is an enlarged view taken as indicated by the line 19—19 in Fig. 18.

Fig. 20 is taken as indicated by the line 20—20 in Fig. 19.

Fig. 21 is taken as indicated by the line 21—21 in Fig. 20.

Fig 22 is taken as indicated by the line 22—22 in Fig. 21.

Figs. 23, 24, 25, 26 and 27 are views taken as indicated by the lines 23—23, 24—24, 25—25, 26—26 and 27—27 in Fig. 20.

Fig. 28 is a schematic electric circuit diagram according to one form of the invention.

Figs. 29, 30 and 31 are schematic diagrams showing the arrangements of the parts of the lighting switch for neutral, left turn, and right turn positions, respectively, of the directional lever, and are to be considered in conjunction with Fig. 28.

Fig. 32 shows the directional lever and associated mechanism, with the lever in neutral position in full lines, in left turn position in dash lines, and in right turn position in dotted lines.

Fig. 33 is a schematic electric circuit diagram according to another form of my invention.

Fig 34 is similar to Fig. 2 but shows a modification.

Fig. 35 is taken as indicated by the line 35—35 in Fig. 34.

Fig. 36 shows how the shut-off switch may be mounted for operation by a steering mechanism such as is used in military tanks and tractors.

Fig. 37 shows a modified casing for the directional lever and associated mechanism.

Fig. 38 is taken as indicated by the line 38—38 in Fig. 37.

Fig. 39 is taken as indicated by the line 39—39 in Fig. 38, but shows a modified mounting bracket.

Fig. 40 is a fragmentary schematic electric circuit diagram involving a modification of Figs. 28 and 33.

Referring now more particularly to Figs. 1 to 10, there is provided a clamp 20 formed of spaced straps 22 having angular midportions 24 adapted to engage opposite sides of the nut 25 conventionally found in automobiles and other motor vehicles for securing, with a lock washer 26, the steering gear arm 27 to a rock shaft 28 actuated by the steering gear indicated generally at 29, the straps being equipped with screws 30 and associated nuts 31 so that the clamp may be securely tightened on nuts 25 of various sizes. The straps 22 have inwardly turned lugs 32 engageable with the inner face 33 of the nut 25 to prevent separation of the clamp from the nut. The straps 22 have inwardly-offset lateral channels 34 adapted for disposition at the outer face of the nut 25 and in which are secured at 36 opposite legs 38 of a T-shaped mounting brace spider 40 fixed to a pivot stud 42 journaled in a flanged bushing 44 extending through the base 46 of a casing 47, including a cover 48 assembled with the base as by rivets 49, for housing a self canceling or shut-off switch 50, details of which appear hereinafter, the stud 42 thus turning with the nut 25.

The switch 50 comprises a switch arm 52 including a plate 54 fixed to the pivot stud 42 and having at its free end a key-hole slot 56 for the reception of a wire spring 58 having an eye 60 at one end, fitting in the enlarged portion 62 of the slot, and having its shank 64 arranged along the narrow portion 66 of the slot and projecting therebeyond to serve as a contact tip. Spring leaves 68 sandwich the slotted portion of the plate 54, and a rivet 70 passing through the leaves and the eye 60 holds the leaves and spring wire 58 in assembly with the plate. The leaves 68 are preferably locked against turning relative to the plate 54, as by means of prongs 72 projecting into holes 74 in the plate.

The switch 50 further comprises a stationary generally V-shaped contact unit 80 with which the switch arm contact tip 64 cooperates. The contact unit 80 is laminated and consists of an outer contact strip 84 insulated by an insulating strip 88 from a preferably metal wear resisting or bearing strip 92. The contact unit 80 has a preferably central neutral notch 94 flanked by oppositely sloping lateral cam lugs 96 and 98, in turn flanked by end notches 100 and 102. Rivets 104 anchor the contact unit 80 to the casing base 46, one of the rivets being connected to a terminal 106. The insulating strip 88 is flanged at 108 about the rivets 104, insulating them from the wear or bearing strip 92, and insulating washers 110 insulate the other ends of the rivets from the base 46, and thus the contact strip 84 and terminal 106 are insulated from the casing 48. The lugs 96 and 98 are disposed in the path of swinging movement of the switch arm spring contact tip 64, and the operation of the switch 50 will appear as the description proceeds.

A modified casing 112 (Fig. 11), constructed to be moisture-proof, may include a soft resilient rubber gasket 113 engaging the casing base 114 and extending about the switch 50 and having a plurality of slots 115 adapted to register with slots 116 through the base, and a cover 118 provided with tongues 120 forced through the gasket slots and passing through the base slots and clinched as at 122 against the outer face of the base, the rim of the cover between the tongues tightly engaging the gasket so that the casing is in effect hermetically sealed.

The manual directional switch assembly is shown generally at 126 (Figs. 1 and 12 to 17), and comprises a casing 127 formed of two cover parts 128 and 129 fastened together as by a screw 130 and affording an opening 131 through which passes an actuating lever 132 within convenient reach of the driver's hands, the opening being sufficiently large to allow clearance for manual movement of the lever by the driver as the vehicle is to make a left turn or a right turn. The cover parts 128 and 129 may be formed to provide together an arcuate recess 135 for more or less closely receiving a steering column 136 (Fig. 1), and the cover part 129 is preferably formed with an arcuate groove 137 (Figs. 13, 14) to receive the intermediate portion of a resilient or flexible clamping band 138 confined in the groove when the cover parts are fastened together, the end portions 139 of the band being adapted with the cover to more or less completely embrace the steering coulmn. The end portions 139 of the band 138 may be slotted as at 140 to selectively receive angle brackets 141 which may be drawn toward each other as by a bolt 142 and nut 143 to adjustably clamp the casing 127 to steering columns of various diameters.

The directional lever 132 has a hub 144 (Figs. 13, 14, 15) within the casing 127, the hub being journaled about the screw 130, the inner end 145 of the lever carrying an axle 146 on which is mounted a roller 147 adapted for cooperation with a latch 148 secured to an armature 149 hinged at 150 to a magnet frame 151 mounted in the casing cover part 129. The magnet frame 151 carries a coil magnet 152 comprising a coil 153 from which extend two wire-receiving terminals 154 and 156. Springs 158 connected to the ends 160 of the latch 148 and to a bracket 162 fixed as at 163 to the casing 127 constantly urge the latch toward the roller 147, so that, when the magnet coil 153 is deenergized, the springs hold the latch in contact with the roller 147, the latch having a central notch 164 in which the roller is received in response to the pull of the springs when the lever 132 is in neutral position (Fig. 14, with latch in dot-dash position).

When the lever 132 is moved in the direction to signal a left turn (i. e., counter-clockwise), the roller 147 exerts a camming force on the tapered wall 166 of the notch 164, forcing the latch 148 to swing toward the magnet 152 against the resistance of the springs 158. Thereupon, as the lever 132 continues to turn, the roller 147 rides along the arcuate edge 168 extending from the notch wall 166, and, when the roller reaches the outer end of said edge, the springs 158 snap the latch 148 away from the magnet and cause the roller to ride along the tapered wall 170 of and into the end notch 172 of the latch, so that the latch then acts as a detent to yieldably retain the lever 132 in the position to which it has been turned by the driver.

When under the circumstances just set forth the magnet coil 153 is energized, the latch 148 is rocked about the hinge 150 toward the magnet 152, thus releasing the roller 147 from the latch, whereupon a spring 174 (hereinafter described) returns the lever 132 to neutral position. It is apparent that, before the coil 153 is energized, should the driver wish to return the lever 132 to neutral position, he may do this manually, whereupon the roller 147, exerting a camming effect on the tapered wall 170 of the end notch 172, will force the latch 148 to yield against the resistance of the springs 158 to eventually locate the roller in the neutral notch 164 of the latch. The operation for a right turn is identical with that just described, except of course that the lever 132 is turned clockwise and the roller-engaging walls 176 and 178 and arcuate edge 180 and end notch 182 of the latch 148 come into play.

Also located within the casing 127 is a lighting switch unit 190 (Figs. 13, 14, 16, 18 to 25) including a slide assembly 192 having a pin 194 projecting in a slot 196 in the inner end 145 of the lever 132. The switch unit 190 comprises a casing 198 including a cup-like cover 199 and a contact base 200 having a peripheral ledge 201 on which the cover rim seats and also having notches 202 for the reception of feet 203 extending from the rim, said feet being clinched inward against the bottom of the base. The casing 198 contains the slide assembly 192 and is secured as at 204 to the bracket 162 and has in its central portion or web 205 a central longitudinal slot 206 through which the pin 194 projects, and also having tongues 208 and 209 disposed centrally at the ends of and projecting inward from the slot. The slide assembly 192 includes a block 210 of insulating material in sliding engagement with the casing 198 and having a central longitudinal upper slot with relatively narrow ends 216 in which the tongues 208 and 209 project and a relatively wide intermediate portion 218 in which the coil spring 174 seats, the latter portion being located in an upwardly extending projection 220 of the block.

The block projection 220 has upwardly extending longitudinal marginal ribs 222 between which the web 224 of a plate 226 fits, and also has end notches 228 in which fingers 230 extending transversely from said web are clinched, thus interlocking the block 210 and plate. The pin 194 is riveted to the plate web 224, and the cover tongues 208 and 209 pass through alined opposite longitudinal web slots 232 registering with the slot ends 216 in the block 210, the tongues being disposed at the ends of the spring 174, which is selectively compressed between one or the other of the tongues and the opposite end of the slot 218 as the slide assembly 192 is moved in one direction or the other pursuant to swinging of the lever 132 from neutral position.

The lower portion 236 of the block 210 is recessed at 237 for the floating reception of tongues 238 projecting from the ends of two switch plates 240 and 242 and from a substantially straight switch plate 244, and has three pockets 246 containing compressed coil springs 248 engaging intermediate portions of the three switch plates. The switch plate 240 is formed with three dents 250, 252 and 254, the switch plate 242 with three dents 256, 258 and 260, and the switch plate 244 with two dents 262 and 264.

The contact base 200 is provided with a longitudinal marginal series of three contacts 278, 280 and 282 arranged below the line of the two marginal dents 262 and 264 of the switch plate 244; with a longitudinal central series of four contacts 284, 286, 288 and 290, arranged below the line of the two central dents 254 and 260 of the switch plates 240 and 242; and with a longitudinal marginal series of five contacts, 292, 294, 296, 298 and 300 arranged below the line of the four marginal dents 250, 252, 256 and 258 of the latter two switch plates. The base contacts 284 and 294 are joined by a conductor 301, the base contacts 290 and 298 are joined by a conductor 302, the base contacts 278 and 282 are joined by a conductor 303, and the base contacts 292 and 300 are joined by a conductor 304.

Referring now more particularly to Figs. 28 to 31, a wire 306 extends from the base contact 280 to the magnet coil terminal 154, the other terminal 156 of the magnet coil 153 being connected by wires 307 and 308 to the hot side 309 of the vehicle battery 310, the negative 312 of the battery being grounded at 314. A wire 320 connected to the base contact 278 leads to the terminal 108 of the contact unit strip 84. A wire 324 leading from the magnet coil terminal 156 is connected to the movable element 326 of the vehicle stop (brake) switch 328, the stationary contact 329 of which is connected by a wire 330 to the base contact 300.

The wires 307 and 308 are connected to a terminal 333 leading from the hot contact 334 of a tungsol flasher unit 336, a second contact 338 of which is connected to a wire 340 joined to a terminal 342 of a socket 344 (Figs. 13, 16) for a tell-tale lamp 346 (Fig. 12), said socket being mounted in and grounded by means of a bracket 347 secured as at 348 within the casing 127, and the third contact 350 of the flasher unit is connected by a wire 351 to the base contact 296. The glow of the tell-tale lamp 346 may be seen by the driver through the window 354 in the casing 127.

The base contacts 286 and 288 are connected by wires 400 and 402 to the front left and right directional light sockets 408 and 410, respectively, the base contacts 284 and 294 are connected by a wire 412 to the rear left directional light socket 420, and the base contacts 290 and 298 are connected by a wire 414 to the rear right directional light socket 422, the lamps for the latter two sockets also serving as stop lights, as will appear.

When the lever 132 is in neutral position (Fig. 29, full and dot-dash lines in Fig. 28, and full lines in Fig. 32): the dents 262 and 264 on the switch plate 244 are disposed between the base contact 280 and the base contacts 278 and 282, thus spacing all of said contacts from said switch plate; the position of the arm 52 of the magnet control switch 50 may vary, depending on whether the car is on a neutral course or is turning, but in any event said arm can have no effect while the contact 280 is not connected to either of the contacts 278 and 282, since then the circuit through the magnet coil 153 is open; the base contacts 292 and 294 are connected by the dents 250 and 252 on the switch plate 240, and the base contacts 298 and 300 are connected by the dents 256 and 258 on the switch plate 242; so that, when the brake switch 328 is closed, circuits are completed to the left and right stop lights 420 and 422. Thus the stop lights 420 and 422 will operate upon the braking of the vehicle notwithstanding neutrality of the directional lever 132.

The position of the directional lever 132 does not affect the parking lights nor the tail lights since all of said lights are manifestly under the control of the dash switch.

When, in anticipation of a left turn of the vehicle, the driver turns the directional lever 132 counter-clockwise, the lever roller 147 cams the latch 148 toward the magnet 152 against the resistance of the springs 158 until the roller snaps into the position shown in Fig. 15, and at the same time the lever actuates the pin 194 to move the slide assembly 192 in the direction of the arrow 424 (Fig. 28) to a position to produce the following results (Fig. 30, full and dash lines in Fig. 28, and dash lines in Fig. 32): the spring 174 is compressed between the cover tongue 209 and the opposite end of the spring slot 218; the switch plate 244, through its dents 262 and 264, establishes connection between the base contacts 280 and 282 to place the magnet coil 153 in circuit with the contact strip 84 of the switch 50; the switch plate 240, through its dents 250, 252 and 254, establishes connection between the base contacts 294, 296 and 286, thus placing the left front directional and stop lights 408 and 420 in circuit with the flasher unit 336, so that the lights will blink, and the switch plate 242, through its detents 256 and 260, establishes connection between the base contacts 290 and 300, thus maintaining the circuit to the right stop light 422, so that, if the brake switch 328 is closed, the right stop light will glow continuously. As the steering wheel 430 (Fig. 1) and vehicle turn left, the steering arm nut 25 and the switch arm 52 likewise turn. The inner (inactive) face 432 of the contact strip unit lug 96 lies in the path of this movement of the switch arm tip 64 (Figs. 5, 10, 28) which, being resilient, is flexed camwise and snaps past and clear of said lug and into the end notch 100 back to its initial level, where it remains until completion of the turn by the vehicle.

When the driver thereupon turns the steering wheel 430 clockwise for the purpose of arranging the vehicle on a neutral course in the new direction, the steering arm nut 25 and consequently the switch arm 52 are similarly moved. Immediately or shortly after the commencement and before the completion of this neutralizing movement of the steering wheel 430, the switch arm tip 64 engages the live face 434 of the contact strip unit lug 96, closing a circuit through the base contacts 282 and 280 to the magnet coil 153, which thereupon retracts the latch 148 clear of the lever roller 147 (i. e., from the dot-dash line position to the full line position, Fig. 14), whereupon the spring 174 is freed of the retaining influence of the latch and immediately expands and snaps the lever 132 and slide assembly 192 to neutral positions, in which the switch plates 240, 242 and 244 are again arranged as shown in Fig. 29, with the base contact 280 unconnected to either of the base contacts 278 and 282, thus opening the circuit to the magnet coil to thereby release the latch, which the springs 158 then snap away from the magnet 152 and toward the roller to the dot-dash line position shown in Fig. 14, so that the roller is again lodged in the neutral notch 164 of the latch. Immediately thereafter, as the clockwise rotation of the steering wheel 430 continues toward neutral position, the switch arm tip 64 snaps free of the contact face 434 of the lug 96 to its initial level in the neutral notch 94 (Fig. 10) and is centrally located relative to the lugs 96 and 98 when the vehicle is again on a neutral course in its new direction.

When, in anticipation of a right turn of the vehicle, the driver turns the directional lever 132 clockwise, the lever roller 147 cams the latch 148 toward the magnet 152 against the resistance of the springs 158 until the roller snaps into the latch notch 182, and at the same time the lever actuates the pin 194 to move the slide assembly 192 in the direction of the arrow 426 (Fig. 28) to a position to produce the following results (Fig. 31, full and dotted lines in Fig. 28, and dotted lines in Fig. 32): The spring 174 is compressed between the cover tongue 208 and the opposite end of the spring slot 218; the switch plate 244, through its dents 262 and 264, establishes connection between the base contacts 278 and 280 to place the magnet coil 153 in circuit with the contact strip 84 of the switch 50; the switch plate 240, through its dents 254 and 252, establishes connection between the base contacts 284 and 292, thus maintaining the circuit from the brake switch 328 to the left stop light 420 so that said light will glow continuously when the brake switch is closed; and the switch plate 242, through its dents 260, 256 and 258, establishes connection between the base contacts 288, 296 and 298, thus placing the right front directional light 410 and the right stop light 422 in circuit with the flasher unit 336 so that both lights will blink. As the steering wheel 430 and vehicle turn to the right, the steering arm nut 25 and the switch arm 52 likewise turn, with the result that the switch arm contact tip 64 is cammed inward by the inner (inactive) face 436 of the contact unit lug 98 and snaps into the end notch 102 back to its initial level, where it remains until completion of the turn by the vehicle.

When the driver thereupon turns the steering wheel 430 counter-clockwise for the purpose of arranging the vehicle on a neutral course in the new direction, the steering arm nut 25 and the switch arm 52 are similarly moved. Immediately or shortly after the commencement and before completion of this neutralizing movement of the steering wheel 430, the switch arm tip 64 engages the live face 438 of the contact unit lug 98, closing a circuit through the base contacts 278 and 280 to the magnet coil 153, which thereupon retracts the latch 148 clear of the lever roller 147 (Fig. 14), whereupon the spring 174 is freed of the retaining influence of the latch and immediately expands and snaps the lever 132 and the slide assembly 192 to neutral positions (Figs. 14 and 29), thus opening the circuit to the magnet coil to thereby release the latch, which the springs 158 then snap away from the magnet 152 and toward the roller 147 to the dot-dash line position shown in Fig. 14, so that the roller is again lodged in the neutral notch 164 of the latch. Immediately thereafter, as the counter-clockwise rotation of the steering wheel 430 continues toward neutral position, the switch arm tip 64 snaps free of the contact face 438 of the lug 98 to its initial level in the neutral notch 94 and is centrally located relative to the lugs 96 and 98 when the vehicle is again on a neutral course in its new direction.

The apparatus just described is adapted for use on vehicles as standard equipment. For vehicles lacking provision for directional signaling, the major portion of the above described apparatus may be incorporated in the vehicle by substituting left and right front double filament lamp sockets and double filament lamps for the single filament left and right front (parking) sockets and single filament lamps therefor, one lamp at each side serving as a parking light and the other at that side as a directional light, or by installing, separate and apart from the parking lights already on a vehicle, a set of front left and right directional light sockets and lamps therefor.

A shut-off switch unit 50 and associated clamp mechanism at the steering arm nut 25, and the casing 127 and contents thereof, together with the various wires to be connected, may be furnished as a kit to the installer who may provide his own flasher unit 336, and the separate wire 308 may be furnished by the installer or by the kit manufacturer, and the kit will include, in one harness, the nine wires, namely 307, 324, 330, 340, 351, 400, 402, 412 and 414, whose outer ends are to be connected by the installer, the harness of nine wires extending from the casing 127 through the opening 439 therefor, and such a kit, being named according to the number of wires in the harness, is accordingly termed a 9-wire conversion kit. In a kit which includes as a part thereof a flasher unit 336, the flasher unit will be located in the casing 127, so that the wires 340 and 351 will not extend from the casing and thus the installer need not concern himself with the wires 340 and 351. Such a kit is accordingly termed a 7-wire conversion kit.

In the case of a vehicle having no provision for directional signaling, where the owner does not wish to disturb his parking light, tail light and stop light equipment and wiring therefor, a kit such as that about to be described (Fig. 33) may be installed, including two front single-filament directional light sockets 440 and 442, one for the left and the other for the right, and lamps therefor, and two rear single-filament directional light sockets 444 and 446, one for the left and the other for the right, and lamps therefor, the several sockets to be mounted in appropriate positions on the vehicle and, with the remainder of the kit, to become a part of the vehicle assembly. To the extent that this system is identical with the system hereinabove described, identical reference numerals are used.

The hot side 309 of the battery 310 is connected by a wire 308 to the hot contact 334 of the flasher unit 336, and by a wire 307 to the magnet coil 153, and the left front and left rear directional light sockets 440 and 444 are connected by wires 448 and 450 to the base contact 286. The right front and right rear directional light sockets 442 and 446 are connected by wires 452 and 454 to the base contact 288. Inasmuch as this system is completely independent of the parking, tail and stop lights and brake switch and other controls therefor, the base contacts 284, 290, 292, 294, 298 and 300 (Fig. 28) serve no purpose and accordingly are not used in this system and are ignored in this description.

When, in anticipation of a left turn of the vehicle, the driver turns the directional lever 132 counter-clockwise, the lever roller 147 cams the latch 148 and snaps into the position shown in Fig. 15, and at the same time the lever actuates the pin 194 to move the slide assembly 192 in the direction of the arrow 424 (Fig. 33) to a position to produce the following results (Fig. 30, full and dash lines in Fig. 33, and dash lines in Fig. 32): the spring 174 is compressed between the cover tongue 209 and the opposite end of the spring slot 218; the switch plate 244, through its dents 262 and 264, establishes connection between the base contacts 280 and 282 to place the magnet coil 153 in circuit with the contact strip 84 of the automatic canceling switch 50; and the switch plate 240, through its dents 254 and 252, establishes connection between the base contacts 286 and 296, thus placing both the left front and the left rear directional lights 440 and 444 in circuit with the flasher unit 336, so that these two lights will blink. As the steering wheel 430 and vehicle turn left, the steering arm nut 25 and consequently the switch arm 52 likewise turn. The inner (inactive) face 432 of the contact strip unit lug 96 cams the switch arm tip 64 inward and then the tip springs into the contact unit end notch 100 back to its original level, where it remains until completion of the turn by the vehicle.

When the driver thereupon turns the steering wheel 430 clockwise for the purpose of arranging the vehicle on a neutral course in the new direction, the steering arm nut 25 and consequently the switch arm 52 are similarly moved. Immediately or shortly after the commencement and before completion of this neutralizing movement of the steering wheel 430, the switch arm tip 64 engages the live face 434 of the contact unit lug 96, closing a circuit through the base contacts 282 and 280 to the magnet coil 153, which thereupon retracts the latch 148 clear of the lever roller 147 (Fig. 14), whereupon the spring 174 is freed of the retaining influence of the latch and immediately expands and snaps the lever 132 and slide assembly 192 to neutral positions, thus opening the circuit to the magnet coil to thereby release the latch, which the springs 158 then snap away from the magnet 152 and toward the roller to the dot-dash line position shown in Fig. 14, so that the roller is again lodged in the neutral notch 164 of the latch. Immediately thereafter, as the clockwise rotation of the steering wheel 430 continues toward neutral position, the switch arm tip 64 snaps free of the contact face 434 of the lug 96 to its initial level in the neutral notch 94 (Fig. 10) and is centrally located relative to the lugs 96 and 98 when the vehicle is again on a neutral course in its new direction.

When, in anticipation of a right turn of the vehicle, the driver turns the directional lever 132 clockwise, the lever roller 147 snaps into the latch notch 182, and at the same time the lever actuates the pin 194 to move the slide assembly 192 in the direction of the arrow 426 (Fig. 33) to a position to produce the following results (Fig. 31, full and dotted lines in Fig. 33, and dotted lines in Fig. 32): the spring 174 is compressed between the cover tongue 208 and the opposite end of the spring slot 218; the switch plate 244, through its dents 262 and 264, establishes connection between the base contacts 278 and 280 to place the magnet coil 153 in circuit with the contact strip 84 of the automatic canceling switch 50; and the switch plate 242, through its dents 260 and 256, establishes connection between the base contacts 288 and 296, thus connecting both the right front and rear directional lights 442 and 446 in circuit with the flasher unit 336, so that these two lights will blink. As the steering wheel 430 and vehicle turn to the right, the steering arm nut 25 and consequently the switch arm 52 likewise turn, with the result that the switch arm contact tip 64 is cammed by the inner (inactive) face 436 of the contact unit lug 98 and snaps into the end notch 102 back to its initial level, where it remains until completion of the turn by the vehicle.

When the driver thereupon turns the steering wheel 430 counter-clockwise for the purpose of arranging the vehicle on a neutral course in the new direction, the steering arm nut 25 and the switch arm 52 likewise turn. Immediately or shortly after commencement and before completion of this neutralizing movement of the steering wheel, the switch arm tip 64 engages the live face 438 of the contact unit lug 98, closing a circuit through the base contacts 278 and 280 to the magnet coil 153, which thereupon retracts the latch 148 clear of the lever roller 147 (Fig. 14), whereupon the spring 174 is freed of the retaining influence of the latch and immediately expands and snaps the lever 132 and the slide assembly 192 to neutral positions (Figs. 14 and 29), thus opening the circuit to the magnet coil to thereby release the latch, which the springs 158 then snap away from the magnet 152 and toward the roller 147 so that the roller is again lodged in the neutral notch 164 of the latch. Immediately thereafter, as the neutralizing motion of the steering wheel continues, the switch arm tip 64 snaps free of the contact face 438 of the lug 98 to its initial level in the neutral notch 94 and is centrally located relative to the lugs 96 and 98 when the vehicle is again on a neutral course in its new direction.

If the vehicle owner supplies the flasher unit 336, the kit just described will be a 6-wire conversion kit, including the separate wire 308 and, in its harness, the connecting wires 307, 320, 340, 351, 450 and 454. If the flasher unit is included in the kit, it will be located in the casing 127 and the kit will be a 4-wire conversion kit, including the connecting wires 307, 320, 450 and 454.

In the circuits above described, the magnet coil 153 is connected directly to the hot side 309 of the battery 310, and thus the directional lights may be operated regardless whether the ignition switch is on or off. Such an arrangement may be desirable since, when the vehicle is stopped on a highway, the directional lever 132 may be turned to cause the appropriate lights to blink as a warning to motorists moving in both directions, without danger of damage to the ignition points such as might occur if the ignition switch were turned on and the engine not running.

However, some people prefer that the directional lights be inoperative when the ignition switch is off, and for them the various circuits may be modified as shown in Fig. 40, wherein the ignition switch 460 is interposed between the battery 310 and the magnet coil 153 and is connected to the former by a wire 462, forming part of the original vehicle assembly, and to the latter by the wire 307. The operation with such modified circuits will be readily understood from the foregoing.

Some vehicles are equipped with key switches which have two "on" positions, one for ignition and accessories including directional lights and the other for controlling accessories alone, including directional lights. In such vehicles, the circuits can include the accessory position of the key without danger of damage to the ignition points.

The casing base 46 is formed with a mounting extension 464 having a hole 465 for the reception of means 466 for fastening and grounding the same on the chassis or other suitable part of the vehicle, and is also formed with an aligning extension 467 with a hole 468 for the reception of an aligning screw 469 threaded in a tapped hole 470 in the arm 471 of the mounting spider 40. The screw 469 forms a part of the kit, but is used only during installation on the vehicle. Its sole function is to initially lock the switch arm 52 in neutral position so that the switch arm tip 64 is centered between the contact unit lugs 96 and 98 when the steering wheel, and consequently the steering arm nut 25 and shaft 26, is in neutral position. When under these conditions the clamp 20 is secured on the nut 25, the installer removes the screw 469 so that the switch arm will always be in neutral position when the steering wheel is in neutral position, and will turn left and right when the steering wheel so turns.

A modified self-canceling switch mounting assembly is shown in Figs. 34 and 35, and comprises a mounting C-strap 472 whose web 474 is clamped between the nut 25 and the steering arm 27 about the rock shaft 26 to rock therewith, said strap being secured as at 476 to a second C-strap 478 riveted to a pivot stud 480 which rotates therewith. The strap 472 may have end channels 481 to prevent relative rotation between the straps. The stud 480 is journaled in a bushing 482 threaded in the base 484 of a switch housing 486 containing the switch 50, and a rubber gasket sealing ring 488 in a groove in the stud engages the bushing. The peripheral wall 492 of the housing 486 has near its rim 494 an inner ledge 496 on which seats a rubber gasket 498 engaged by a metal or the like disc 500 and the rim is peened over at 502 against the disc to seal the housing. The switch mechanism 50 within the housing may be the same as that above described.

In some installations, notably military tanks and tractors, no steering wheel is used, the steering being done by means of the left and right brakes. Inasmuch as the automatic return of the directional lever to neutral position when the vehicle resumes a straight course, according to my invention, does not require the mounting of the lever in association with the steering column, it follows that a military tank or tractor poses no problem in this respect, the directional lever and associated mechanism being provided with suitable mounting means such as a mounting bracket mountable on a panel or otherwise at any point within convenient reach of the driver. Fig. 36 shows fragmentarily the steering gear and transmission housing 506 of such an installation, with a bell-crank lever or rock plate 508 secured to a shaft 510 of the steering mechanism by a nut 512 such as may be used to secure a steering arm if such an arm were to be used. The plate 508 is connected as by cables 514 to the respective brake levers (not shown), so that depression and release of the levers will produce the same results respecting self-cancellation as turning the steering wheel in a vehicle equipped therewith.

Some military tanks and tractors and very large military trucks are equipped with two sets of steering installations, and two drivers man such vehicles, the co-driver taking control with his equipment without the necessity of moving the other driver when the latter is wounded or otherwise incapacitated in transit. In such vehicles one self-canceling switch unit and two independent directional mechanisms may be provided, one for each steering mechanism, with a common set of directional lights.

The self-cancelling switch housing base 484 is formed with a mounting extension 520 having a hole for the reception of a bolt 524 to mount and ground the housing on the chassis or other suitable part of the vehicle, and is also formed with an aligning extension 526 with a hole 528 for the reception of an aligning screw 530 adapted to be threaded into a tapped hole 532 in the mounting member 478. The purpose of this construction is the same as that described above in connection with Figs. 2 to 6.

A modified directional lever and associated casing or cover assembly is shown in Figs. 37, 38 and 39. One of the purposes of this construction is to provide a watertight assembly, and, to that end, the casing 540 comprises a pair of cover parts 542 and 544 recessed at one end to provide a preferably circular opening with a groove 546. A preferably rubber sleeve 548 is tightly fitted at one end 549 about the directional lever 132 and has its other end 550 enlarged, with an outer peripheral bead adapted to be forced by a steel or other suitable band 552 tightly into the groove 546. A gasket 554 between the remaining rim portions of the cover parts 542 and 544 completes the sealing of the casing, the parts being held in assembly as by screws 556.

The casing 540 may have a tell-tale lamp glow window 558 and also an enlargement 560 to house the flasher unit 336, and may be formed like that above described for assembly of a steering column clamp 139 therewith. The casing 540 may also include a threaded sleeve 562 enclosing prongs (not shown) for connection with sockets in a cable (not shown), corresponding to the harness above described, and, where no steering column is present, as on a military tank, for example, or where it is desired for any reason to mount the casing on another part of the vehicle with the directional lever in convenient reach of the driver, a mounting bracket 564 for that purpose may be secured to the sleeve (Fig. 39).

Various modifications coming within the spirit of my invention may suggest themselves to those skilled in the art, and hence I do not wish to be limited to the specific forms shown or uses mentioned, except to the extent indicated in the appended claims, which are to be interpreted as broadly as the state of the art will permit.

I claim:

1. A switching mechanism, comprising a metallically connected pair of spaced metal contacts, a metallic spring arm for selectively engaging said contacts, said arm in neutral position being disposed between and out of touch with said contacts and having extreme positions between which said contacts are disposed out of touch with said arm, and means adjacent each contact for insulating said contact from said arm during outward movement of said arm, said means being inclined across the path of outward movement of said arm so as to flex said arm, said arm, as it passes outward beyond said means, springing back into its normal path, said contacts being inclined across the path of inward movement of said arm so as to flex said arm, said arm, as it passes inward beyond each such contact, springing back into its normal path.

2. A switching mechanism, comprising a member having a pair of spaced contact elements, a second member having a contact, one of said members being movable to a neutral position to locate said contact in a neutral position between and spaced from said contact elements and also movable to the left or right to selectively locate either of said contact elements between the other contact element and said contact, and spaced from said contact, and means for preventing engagement between said contact and either of said contact elements before commencement of return movement of said movable member toward neutral position.

3. A switching mechanism, comprising a V-shaped member including a pair of outer and inner metallic V-shaped elements secured to and insulated from each other, each element having a lug on each leg of the V, said lugs being substantially spaced from the apex of the V, the lugs of each element registering with the lugs of the other element, a switch arm arranged so that the lugs incline across the plane of swinging of said arm, said arm in its neutral position extending between and out of contact with said lugs, said lugs being disposed between the extreme positions to which said arm may swing, whereby said arm will be deflected by one or the other of the inner lugs before reaching one or the other of its extreme positions and, in returning to its neutral position, will engage the adjacent lug of the outer strip and be deflected thereby before reaching its neutral position.

4. A switching mechanism, comprising a pair of spaced metal lugs, a pivoted resilient switch arm, said lugs being inclined across the path of swing of said arm, said arm being disposed between and out of contact with said lugs when said arm is in neutral position, means electrically connecting said lugs to each other, and means preventing electrical engagement between said arm and said lugs during outward movement of said arm to positions outward beyond the respective lugs, said arm upon its return movement being engageable with the adjacent lug.

5. In a vehicle, a steering member, a switch arm having a resilient contact tip, means for connecting said arm to said member for movement therewith, a switch contact inclined across the path of swing of said arm, said tip being out of touch with said contact when said steering member is in neutral position, and means preventing electrical engagement between said tip and said contact during movement of said arm outward beyond said contact, said arm upon its return movement being engageable with said contact.

6. A switching mechanism for a motor vehicle in which the steering pitman is assembled with the steering shaft by means of a nut, said mechanism comprising a pair of spaced metal lugs, a pivoted resilient switch arm, said lugs being inclined across the normal path of swing of said arm, said arm being disposed between and out of contact with said lugs when said arm is in neutral position, means electrically connecting said lugs to each other, and means preventing electrical engagement between said arm and said lugs during outward movement of said arm to positions outward beyond the respective lugs, said arm being engageable with the adjacent lug upon return movement of said arm, a clamp connected with said arm for rotation in unison therewith, said clamp being engageable about the steering pitman assembling nut so that said arm will turn with the nut.

7. In a vehicle direction signalling system, an electromagnet, an armature for said magnet, said armature constituting a latch having a series of three notches, spring means biasing said latch away from said magnet, a lever, a roller carried by an arm of said lever and engageable, when said magnet is deenergized, in the intermediate notch when said lever is in neutral position and selectively in the end notches when said lever is in left turn or right turn indicating position, said roller, in the movements of said lever between neutral and right and left turn indicating positions, camming said latch against the resistance of said spring means and said spring means yieldably holding said roller in the selected notch, means for energizing said magnet to thereby unlatch said lever, means for returning said lever to neutral position upon unlatching of said lever, and means for deenergizing said magnet to re-latch said lever.

8. In a direction signalling system for a vehicle including left and right signal lights and circuits therefor, a lever having a neutral position and two selectively settable positions, switch means in said circuits under the control of said lever and selectively operative according as said lever is in one or the other of its settable positions to close the left turn or the right turn signal light circuit, said switch means being open when said lever is in neutral position, a magnet, an armature for said magnet, said armature constituting a latch, spring means biasing said latch into position to yieldably retain said lever in its selected settable position when said magnet is deenergized, spring means biasing said lever toward its neutral position, and means operative to energize said magnet to unlatch said lever and thus enable the second mentioned spring means to return said lever to neutral position and thereafter operative to deenergize said magnet to enable the first spring means to move said armature into lever-latching position.

9. In a vehicle direction signaling device, a housing, a movable member in said housing and having a neutral position and two selectively settable positions, one on each side of the neutral position, a lever pivoted relative to said housing and having a lost motion connection with said member and operative to move said member to said positions, said lever having a neutral position and two selectively settable positions corresponding to said positions of said member, and having a handle outside of said housing, electric switches carried by said housing and member and selectively closed according as said lever is in one or the other of its settable positions, and spring means between said housing and said member and biasing said member toward neutral position, said spring means being so arranged as to be flexed pursuant to movement of said lever to either of its settable positions.

10. In a vehicle direction signaling device, a housing, a reciprocable member in said housing and having a neutral position and two selectively settable positions, one on each side of the neutral position, a lever pivoted relative to said housing and having spaced portions slidably straddling a part of said member for reciprocating said member, said lever having a neutral position and two selectively settable positions corresponding to said positions of said member, and having a handle outside of said housing, electric switches carried by said housing and member and selectively closed according as said lever is in one or the other of its settable positions, spring means between said housing and said member and biasing said member toward neutral position, said spring means being so arranged as to be flexed pursuant to movement of said lever to either of its settable positions, and a spring-biased latch in said housing for releasably maintaining said lever in each of its settable positions.

11. In a vehicle direction signaling device, a housing, a movable member in said housing and having a neutral position and two selectively settable positions, one on each side of the neutral position, a lever in said housing and operatively connected to said member for moving said member, said lever having a handle outside of said housing, electric switches carried by said housing and member and selectively closed according as said lever is in one or the other of its settable positions, spring means between said housing and said member and biasing said member toward neutral position, said spring means being so arranged as to be flexed pursuant to movement of said lever to either of its settable positions, a spring biased latch in said housing for releasably maintaining said lever in each of its settable positions, a magnet armature in said housing and carrying said latch, an electromagnet associated with said armature, and means including switches carried by said housing and member for energizing said magnet when said lever is in either of its settable positions to release said lever from said latch.

12. In a vehicle direction signaling device, a casing, a block movable in said casing, said casing and block carrying switch means selectively open or closed according to the position of said block in said casing, a spring between said casing and block and biasing said block toward a position in which said switch means is open, means for moving said block against the resistance of said spring to a position in which said switch means is closed, and a spring-biased latch for releasably maintaining said block in the latter position.

13. In a vehicle direction signaling device, a casing, a block movable in said casing, said casing and block carrying switch means selectively open or closed according to the position of said block in said casing, a spring between said casing and block and biasing said block toward a position in which said switch means is open, means for moving said block against the resistance of said spring to a position in which said switch means is closed, and a spring-biased latch for releasably maintaining said block in the latter position, said latch being yieldable to pressure from said moving means to release said block and thus enable said spring to return said block to its first position.

14. In a vehicle direction signaling device, a casing, a block movable in said casing, said casing and block carrying switch means open or closed according to the position of said block in said casing, a spring between said casing and said block and biasing said block toward a position in which said switch means is open, means for moving said block against the resistance of said spring to a position in which said switch means is closed, a spring-biased latch for releasably maintaining said block in the latter position, a magnet armature carrying said latch, an electro-magnet associated with said armature, and means including said switch means for energizing said magnet to release said block from said latch.

15. In a vehicle direction signaling device, a casing, a block movable in said casing, said block having a neutral position and selectively settable positions, one on each side of the neutral position, said block having a socket elongated in the direction of movement, a spring extending longitudinally in said socket, said socket and casing having portions facing the ends of said spring, said portions engaging said spring ends when said block is in neutral position, and a pair of switch means carried by said casing and block, one of said switch means being closed and the other switch means being open when said block is in either of its settable positions.

16. In a vehicle direction signaling device, a switch unit comprising a support, a metallic shaft journalled in said support, a metallic arm fixed to and extending transverse to the axis of said shaft, a flexible metal wire fixed at a portion thereof to said arm and projecting beyond said arm, metal spring means secured to said arm and comprising a pair of leaf spring members engaging opposite sides of said wire for resisting flexure of said wire in opposite directions in a plane parallel to the shaft axis, said wire having a contact tip extending free beyond said arm and spring members, means confining flexure of said wire to said plane, a switch contact fixed to said support and inclined across the path of swing of said tip, and means on one side of said contact for preventing engagement of said tip with said contact during swing of said tip from one side to the other side of said contact, said tip engaging said contact upon reverse swing of said tip to close the switch, said tip being flexed in said plane by the latter means and by said contact against the resistance of the respective spring members.

17. In a device for neutralizing a vehicle direction signaling system upon completion of a turn of the vehicle, a support, a switch including a stationary contact member insulated from and fixed to said support and also including a movable contact arm journaled in said support, said arm having a contact tip and said member having spaced contacts in the path of swing of said tip, means fixed to said arm for securing said arm to a steering shaft of the vehicle so that said arm will turn with the steering shaft, and removable means for temporarily securing said arm with its contact tip midway between and spaced from said contacts, whereby, when said temporary securing means is removed while the vehicle steering shaft is in neutral position, said tip will thereafter be disposed midway between and spaced from said contacts whenever the vehicle steering shaft is in neutral position.

18. In a device for neutralizing a vehicle direction signaling system upon completion of a turn of the vehicle, a support, a switch including a stationary contact member insulated from and fixed to said support and also including a movable contact arm journaled in said support, said arm having a contact tip and said member having spaced contacts in the path of swing of said tip, means fixed to said arm for securing said arm to a steering shaft of the vehicle so that said arm will turn with the steering shaft, removable means for temporarily securing said arm with its contact tip midway between and spaced from said contacts, whereby, when said temporary securing means is removed while the vehicle steering shaft is in neutral position, said tip will thereafter be disposed midway between and spaced from said contacts whenever the vehicle steering shaft is in neutral position, and means for preventing engagement of said tip with either of said contacts during movement of said tip away from its neutral position, said tip engaging the contact lying in its path of return movement to close said switch.

19. In a vehicle directional signaling system, an electromagnet, an armature for said magnet, a latch movable with said armature and having a series of three notches, spring means biasing said armature away from said magnet, a lever, a roller carried by said lever and engageable, when said magnet is deenergized, in the intermediate notch when said lever is in neutral position and selectively in the end notches when said lever is in left turn or right turn indicating position, said roller, in the movements of said lever between neutral and right and left turn indicating positions, camming said latch against the resistance of said spring means and said spring means yieldably holding said roller in the selected notch, said magnet upon energization thereof being operative to unlatch said lever, and means for returning said lever to neutral position upon unlatching of said lever.

20. In a direction signaling system for a vehicle, a lever having a neutral position and two selectively settable positions, switch means under the control of said lever and being open when said lever is in neutral position, a magnet, an armature for said magnet, a latch movable with said armature, spring means biasing said latch into position to yieldably retain said lever in its selected settable position when said magnet is deenergized, spring means biasing said lever toward its neutral position, and means operative to energize said magnet to unlatch said lever and thus enable the second mentioned spring means to return said lever to neutral position.

21. In a directional signaling system for a motor vehicle, a lever having a neutral position and two selectively settable positions, switch means under the control of said lever and selectively closed according as said lever is in one or the other of its settable positions, said switch means being open when said lever is in neutral position, a magnet, an armature for said magnet, a latch movable with said armature, spring means biasing said latch into position to yieldably retain said lever in its selected settable position when said magnet is deenergized, said magnet upon energization thereof being operative to move and retain said latch out of latching position, and spring means operative to return said lever to neutral position upon energization of said magnet.

22. In a direction signaling system for a vehicle, a lever having a neutral position and a turn position, switch means under the control of said lever and being open when said lever is in neutral position and being closed when said lever is in the turn position, a magnet, an armature for said magnet, a latch movable with said armature, spring means biasing said latch into position to yieldably retain said lever in the turn position when said magnet is deenergized, and spring means biasing said lever toward its neutral position, said lever being unlatched when said magnet is energized, enabling the second mentioned spring means to return said lever to neutral position.

23. In a direction signaling system for a vehicle, a lever having a neutral position and a turn position, a magnet, an armature for said magnet, a latch movable with said armature, spring means biasing said latch into position to yieldably retain said lever in the turn position when said magnet is deenergized, and spring means biasing said lever toward neutral position, said lever being unlatched when said magnet is energized, enabling the second mentioned spring means to return said lever to neutral position.

References Cited in the file of this patent

UNITED STATES PATENTS

| | | |
|---|---|---|
| 1,620,456 | Gallus et al. | Mar. 8, 1927 |
| 1,647,663 | Pollock | Nov. 1, 1927 |
| 1,973,299 | Swartwout | Sept. 11, 1934 |
| 2,064,735 | Curtiss | Dec. 15, 1936 |
| 2,079,003 | Dick | May 4, 1937 |
| 2,090,101 | Bonham | Aug. 17, 1937 |
| 2,111,931 | Howard | Mar. 23, 1938 |
| 2,268,545 | Crider | Jan. 6, 1942 |
| 2,377,628 | Hallett | June 5, 1945 |
| 2,468,974 | Hammer | May 3, 1949 |
| 2,526,611 | Rodrick | Oct. 17, 1950 |
| 2,542,242 | Fuller | Feb. 20, 1951 |
| 2,586,892 | Weber et al. | Feb. 26, 1952 |
| 2,604,560 | Dibelka | July 22, 1952 |